J. A. IMHOF.
METHOD OF PRODUCING COLOR PRINTS.
APPLICATION FILED MAY 23, 1921.

1,384,663.

Patented July 12, 1921.
2 SHEETS—SHEET 1.

Inventor
Joseph A Imhof
By his Attorney
Axel V Beeken

UNITED STATES PATENT OFFICE.

JOSEPH A. IMHOF, OF NEW YORK, N. Y., ASSIGNOR TO INVISIBLE COLOR PRINT CORPORATION, OF NEW YORK, N. Y., A CORPORATION OF NEW YORK.

METHOD OF PRODUCING COLOR-PRINTS.

1,384,663.  Specification of Letters Patent.  Patented July 12, 1921.

Application filed May 23, 1921. Serial No. 471,635.

*To all whom it may concern:*

Be it known that I, JOSEPH A. IMHOF, a citizen of the United States, and a resident of New York city, in the borough of Manhattan, county and State of New York, have invented a new and useful Method of Producing Color-Prints, of which the following is a specification.

This invention relates to the art of printing and has for its main feature and object the printing of a picture or other matter in an apparently uniform color but having latent and substantially invisible color that is released and made visible upon application to the printed surface of a solvent, such as, water. The solvent may be applied to the printed surface by means of a brush and each colored part may be separately developed, but preferably the latent color is so applied that it covers substantially the entire printed surface and upon the application thereto of a solvent, each of the particles of coloring matter distributed over the surface will release just enough color to cover the immediately adjacent surface, so that immersion of the printed surface in water will develop all the colors and will retain the colors in the proper place appropriate to the picture or design to be produced.

Figure 2:
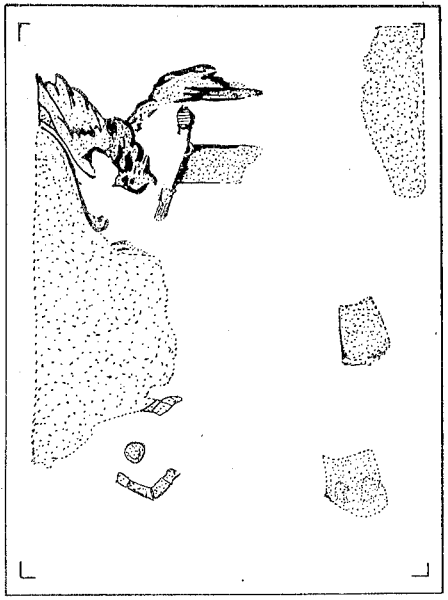
Fig. 2 is a view of a partial image of the picture in Fig. 1 having latent blue coloring matter.
Figure 4:
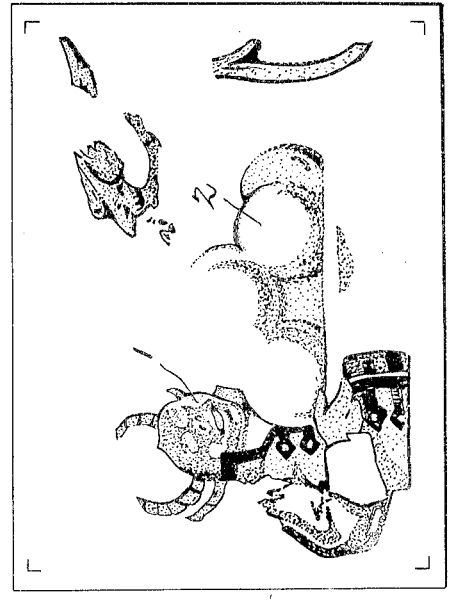
Fig. 4 is a view of a partial image of the picture of Fig. 1 having latent red coloring matter.
Figure 1:
Figure 1 is a view of a complete picture as it will appear after successive superimposed impressions have been made.
Figure 3:
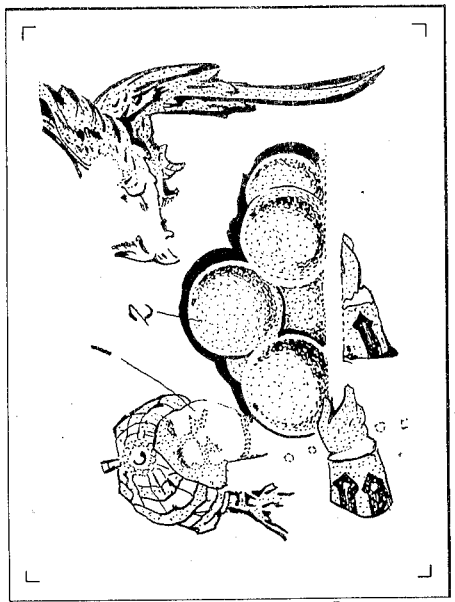
Fig. 3 is a view of a partial image of the picture in Fig. 1 having latent yellow coloring matter.

In preparing the picture, the artist makes separate drawings of the blue, yellow and red partial images as shown in Figs. 2, 3 and 4. These drawings are however made in black or other uniform color, and are reproduced by means of photo-engraving and made into half tone plates or their equivalent such as plates made by the Ben Day process. Three separate impressions are then superimposed on the same surface resulting in the picture shown in Fig. 1. In printing the several partial images soluble anilin color is ground in, or otherwise thoroughly mixed with, the insoluble ink of uniform color, blue for the partial image of Fig. 2; yellow for the partial image of Fig. 3 and red for the partial image of Fig. 4.

To all appearances therefore, a black picture is produced by the superimposing and partial overlapping of the partial images. These partial images contain components of light and shade and of latent color, and where overlapping of partial images occurs, as in the case of the face 1 of the boy, or of the oranges 2 on the tray, regard must be had to the total effect of light and shade in overlapping parts of the image. That is to say, the sum of the shade and light components of overlapping parts must equal the correct amount of light and shade in the complete picture, and the artist must therefore not put the complete shade and light in a partial image where overlapping occurs. Thus in Figs. 3 and 4 each incomplete image carries an incomplete component of light and shade in the face 1 and oranges 2. But here another factor enters. We are dealing not merely with incomplete components of light and shade but also with the superimposing of colors and the amount of light and shade of each partial image depends not merely upon the number of partial images that are necessary to produce a complete image but also upon the amount of coloring matter to be supplied by a partial image. Thus in the case of the oranges 2, the amount of yellow required is considerable as shown by Fig. 3, while the amount of red required, as shown by Fig. 4, is slight. The proportion of shade of partial image Fig. 3 is therefore greater than the proportion of shade of partial image Fig. 4, so far as oranges 2 are concerned. In other words, where overlapping occurs, the total amount of shade required is divided in proportion to the amount of latent color required to be carried in the several partial images, because the insoluble ink carries the soluble coloring matter.

Figure 5:
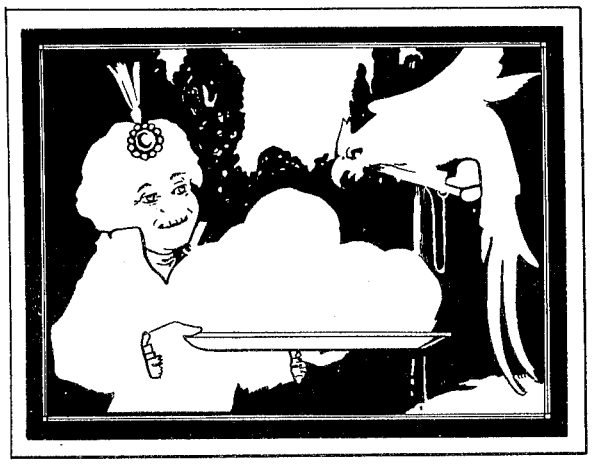
Fig. 5 is a view of a partial image of the picture of Fig. 1 devoid of latent coloring matter and printed in insoluble ink that acts as a dam between differently colored parts of the picture to prevent intermingling of the colors.

In some instances it is preferred to add, to the three superimposed impressions heretofore mentioned, an impression like that shown in Fig. 5. This impression constitutes a dam of insoluble material between the different partial images. This dam may, as in the example shown, constitute a part of the design or complete image and may therefore be printed in insoluble ink. In other cases where the character of the design does not lend itself to having a dam in dead black or other uniform color, said dam may be printed in insoluble varnish, or other material, that will be practically invisible.

The insoluble ink used need not be dead black or of other uniform color, but may have a slight admixture of red, blue or yellow insoluble ink in order to neutralize to the eye the soluble coloring matter before the colors are developed and to more effectually present an appearance of uniform color in the undeveloped print.

Figure 6:
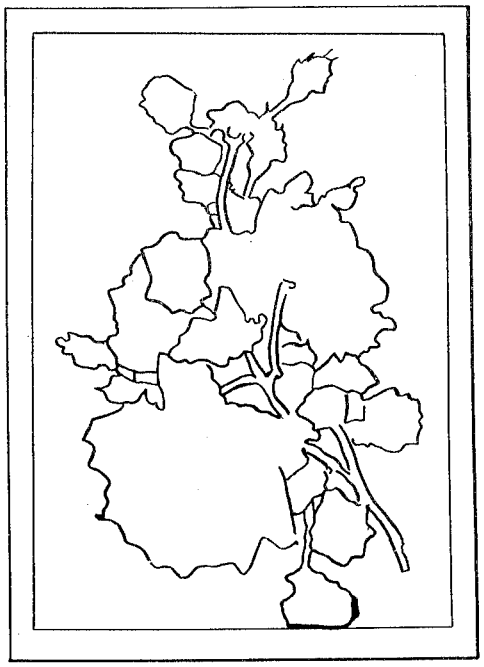
Fig. 6 is a view of a surface containing a dam of varnish, or other insoluble material, applied to the picture to prevent intermingling of colors.
Figure 7:
Fig. 7 is a view of a surface having still another form of dam of varnish, ink or other insoluble material to prevent or disguise overflow of color.

In Fig. 6 is shown a dam of insoluble varnish which is in the form of an outline surrounding the picture and also separating the constituent parts of the pictures. This dam is practically invisible. In Fig. 7 the dam, which may be of insoluble ink or insoluble varnish, is a solid mass surrounding the design of Fig. 6.

By the process above described singularly beautiful effects may be produced, and it is a remarkable fact that I find that the pictures may be developed by immersion substantially without intermingling of the colors. This is facilitated in some instances by retarding the solution of the soluble coloring matter of the different partial images. This may be accomplished by mixing gum arabic with the soluble coloring matter in different proportions so that upon immersion successive color releases are obtained. It is also important that hard coated paper be used on which to print the image. I prefer to use a smooth finish or coated stock.

I claim:

1. The process of producing a design of apparently uniform color but carrying soluble coloring matter in substantially invisible form, which consists in applying a definite amount of coloring matter to the entire surface that is to be colored, by printing, from half-tone plates or the like supplied with a mixture of insoluble ink and soluble coloring matter, a plurality of partial images, in superimposed and partially overlapping relation, said partial images having incomplete components of light and shade and of latent color, the aggregate and overlapping of the partial images creating a complete image of apparently uniform color having requisite light and shade and proper latent coloring.

2. The process of producing a design of apparently uniform color but carrying soluble coloring matter in substantially invisible form which consists in preparing a plurality of half tone plates or the like carrying partial images having incomplete components of light and shade and of latent color which partial images when superimposed and overlapped have requisite light and shade and proper latent coloring, the proportion of light and shade of each partial image being determined by the amount of coloring matter to be supplied by the plate carrying a particular partial image, and then printing successive superimposed impressions from said half tone plates with a mixture of insoluble ink and soluble coloring matter.

3. The process of producing a design of apparently uniform color but carrying soluble coloring matter in substantially invisible form which consists in printing from half tone plates or the like supplied with a mixture of insoluble ink and soluble coloring matter, a plurality of partial images in superimposed relation, and then superimposing by printing a dam of insoluble matter on the plurality of partial images.

4. The process of producing a design of apparently uniform color but carrying soluble coloring matter in substantially invisible form which consists in printing from half tone plates or the like, all except one of which is supplied with a mixture of insoluble ink and soluble coloring matter and one of which is supplied with insoluble ink only a plurality of partial images in superimposed relation to form a complete image.

5. The process of producing a design of apparently uniform color but carrying soluble coloring matter in substantially invisible form which consists in printing from half tone plates or the like supplied with a mixture of insoluble ink and soluble coloring matter, a plurality of partial images in superimposed relation, the soluble coloring matter of the several partial images having different admixtures of gum arabic or the like to give unequal time releases to the coloring matter in the different partial images.

Signed at New York city, in the borough of Manhattan, county and State of New York, this 20th day of May, 1921.

JOSEPH A. IMHOF.